United States Patent
Chuang et al.

(10) Patent No.: US 8,558,980 B2
(45) Date of Patent: Oct. 15, 2013

(54) PIXEL STRUCTURE WITH RECTANGULAR COMMON ELECTRODE

(75) Inventors: Young-Ran Chuang, Tainan (TW); Ching-Huan Lin, Hsinchu County (TW); Chu-Yu Liu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 142 days.

(21) Appl. No.: 13/075,189

(22) Filed: Mar. 30, 2011

(65) Prior Publication Data

US 2012/0169982 A1 Jul. 5, 2012

(30) Foreign Application Priority Data

Dec. 29, 2010 (TW) ................................ 99146621 A

(51) Int. Cl.
*G02F 1/1343* (2006.01)
(52) U.S. Cl.
USPC ........................... 349/144; 349/141; 349/143
(58) Field of Classification Search
USPC .................................. 349/141, 129, 143–144
See application file for complete search history.

(56) References Cited

U.S. PATENT DOCUMENTS

| | | | |
|---|---|---|---|
| 6,924,864 B2 | 8/2005 | Kim | |
| 7,511,789 B2 | 3/2009 | Inoue et al. | |
| 8,259,278 B2 * | 9/2012 | Kim et al. | 349/156 |
| 8,294,852 B2 * | 10/2012 | Adachi et al. | 349/96 |
| 2004/0125280 A1 | 7/2004 | Kim et al. | |
| 2005/0078261 A1 | 4/2005 | Ono et al. | |
| 2009/0153761 A1 | 6/2009 | Park et al. | |

FOREIGN PATENT DOCUMENTS

| | | |
|---|---|---|
| CN | 100451795 C | 1/2009 |
| CN | 201298129 Y | 8/2009 |
| WO | 2010137209 | 12/2010 |

OTHER PUBLICATIONS

"First Office Action of China Counterpart Application", issued on Aug. 28, 2012, p. 1-p. 6, in which the listed references were cited.
"Office Action of Taiwan Counterpart Application", issued on Jun. 5, 2013, p. 1-p. 6, in which the listed references were cited.

* cited by examiner

*Primary Examiner* — Nathanael R Briggs
(74) *Attorney, Agent, or Firm* — Jianq Chyun IP Office

(57) ABSTRACT

A pixel structure including a scan line, a first data line, a second data line, a first active device, a second active device, a first pixel electrode, a second pixel electrode, and a common electrode is provided. The first data line and the second data line are respectively intersected with the scan line. The first pixel electrode is electrically connected to the first data line through the first active device. The second pixel electrode is electrically connected to the second data line through the second active device. The common electrode is located under the first pixel electrode and the second pixel electrode. Both a first voltage of the first pixel electrode and a second voltage of the second pixel electrode are different from a third voltage of the common electrode.

11 Claims, 22 Drawing Sheets

PIXEL STRUCTURE WITH RECTANGULAR COMMON ELECTRODE

CROSS-REFERENCE TO RELATED APPLICATION

This application claims the priority benefit of Taiwan application Ser. No. 99146621, filed Dec. 29, 2010. The entirety of the above-mentioned patent application is hereby incorporated by reference herein and made a part of this specification.

BACKGROUND OF THE INVENTION

1. Field of the Invention

The invention relates to a pixel structure, and more particularly, to a pixel structure capable of efficiently driving the blue phase liquid crystals.

2. Description of Related Art

As display technology advances, people demand more and more about the display quality of a display. In addition to the requirements of high resolution, large contrast ratio, wide viewing angle, fast grey level inversion, favorable color saturation in the display, the response time of the display is further requested to be enhanced.

Accordingly, the manufacturers of the display vigorously develop the display having blue phase liquid crystals while the blue phase liquid crystals have the characteristic of fast response time. For a positive blue phase liquid crystal material, a transversal electric field is required to drive the positive blue phase liquid crystal material, which facilitates the positive blue phase liquid crystal material providing the function of a light valve. Recently, the electrode design of an IPS (In-Plane Switching) display panel or an FFS (Fringe Field Switching) display panel is applied in the blue phase liquid crystal display for driving the positive blue phase liquid crystals therein.

Due to the high dielectric constant of the blue phase liquid crystals, large storage capacitance is demanded to maintain desirable display quality. Generally, metal line is served as a capacitance bottom electrode of the storage capacitance. Therefore, the increase of the storage capacitance usually causes the increase of the disposition area of the metal line, which makes restriction in the display aperture. Accordingly, it is important to provide a design for achieving both large capacitance and display aperture.

SUMMARY OF THE INVENTION

The invention directs a pixel structure having favorable storage capacitance and enhanced driving electric field.

The invention directs to a pixel structure disposed on a substrate for driving a display medium. The pixel structure includes a scan line, a first data line, a second data line, a first active device, a second active device, a first pixel electrode, a second pixel electrode, and a common electrode. The first data line and the second data line are respectively intersected with the scan line. The first active device is electrically connected to the first data line. The second active device is electrically connected to the second data line. The first pixel electrode is electrically connected to the first active device. The second pixel electrode is electrically connected to the second active device. The first pixel electrode and the second pixel electrode are located between the first data line and the second data line. The common electrode is not only disposed between the first pixel electrode and the substrate but also disposed between the second pixel electrode and the substrate. A first voltage of the first pixel electrode and a second voltage of the second pixel electrode both are not identical to a third voltage of the common electrode.

In view of the above, the first pixel electrode and the second pixel electrode alternatively arranged are used to form the driving electric field for driving the display medium according to the invention. Accordingly, a value of the driving electric field can be as large as the largest voltage difference a driving chip can bear, which is help in enhancing the driving electric field. Furthermore, a transparent conductive material is adopted to form a common electrode under the first pixel electrode and the second pixel electrode, so that the storage capacitance is enhanced for maintaining the display quality of the pixel structure.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
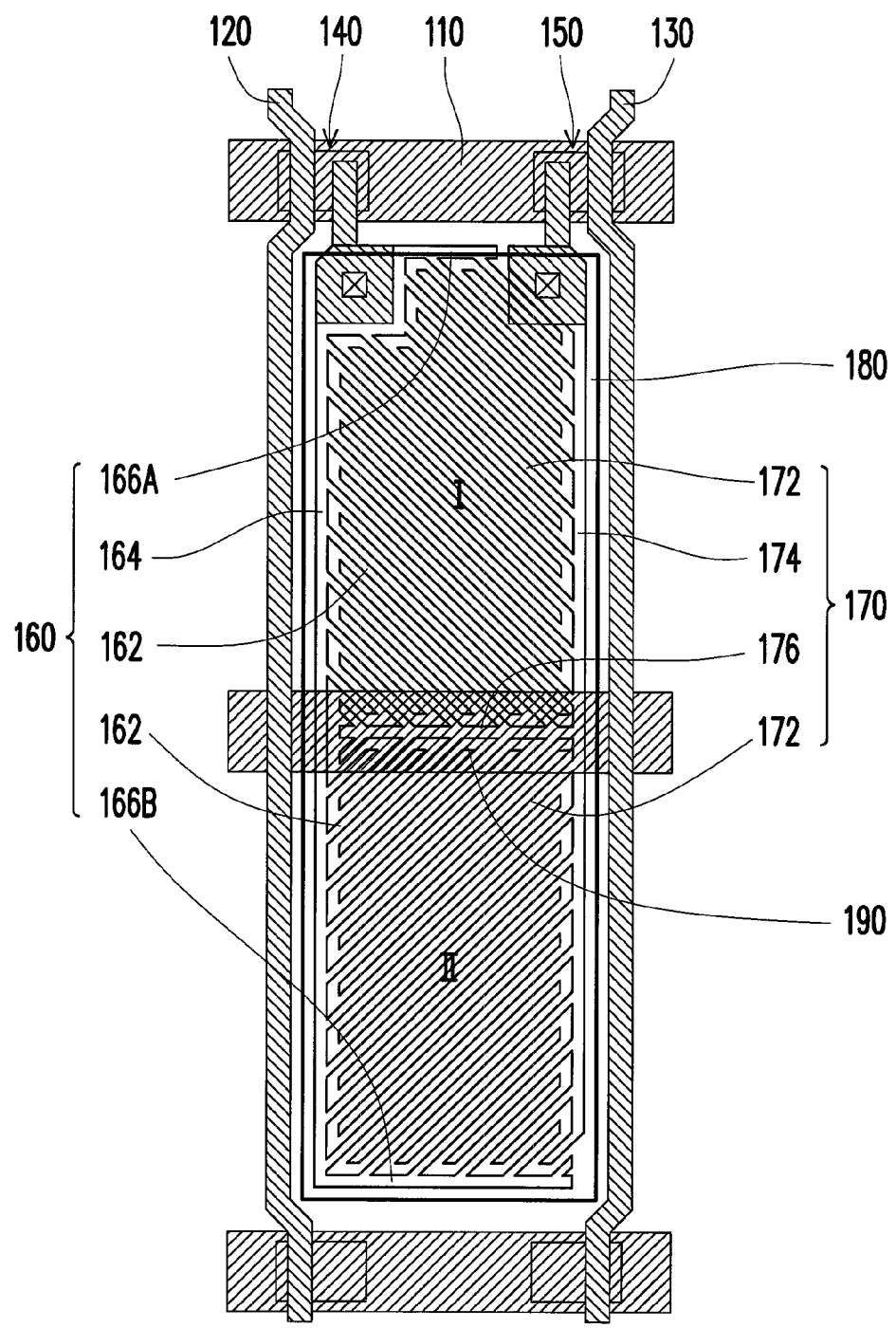
FIG. 1 is a schematic top view of a pixel structure according to a first embodiment of the present invention.

FIG. 1 is a schematic top view of a pixel structure according to a first embodiment of the present invention. With reference to FIG. 1, the pixel structure 100 includes a scan line 110, a first data line 120, a second data line 130, a first active device 140, a second active device 150, a first pixel electrode 160, a second pixel electrode 170, and a common electrode 180. The first data line 120 and the second data line 130 are respectively intersected with the scan line 110. The first active device 140 is electrically connected to the first data line 120. The second active device 150 is electrically connected to the second data line 130. The first pixel electrode 160 is electrically connected to the first active device 140. The second pixel electrode 170 is electrically connected to the second active device 150. The first pixel electrode 160 and the second pixel electrode 170 are located between the first data line 120 and the second data line 130. The common electrode 180 is disposed under the first pixel electrode 160 and the second pixel electrode 170.

In specific, the pixel structure 100 can be adopted in a display panel (not shown) for driving a display medium (not shown). Furthermore, when the pixel structure 100 displays an image, a first voltage of the first pixel electrode 160 and a second voltage of the second pixel electrode 170 both are not identical to a third voltage of the common electrode 180. According to the present embodiment, the first voltage of the first pixel electrode 160 and the second voltage of the second pixel electrode 170 are used for driving the display medium (not shown). Namely, a value of the driving electric field for driving the display medium (not shown) is substantially equivalent to the variance between the first voltage and the second voltage.

The first pixel electrode 160 and the second pixel electrode 170 according to this embodiment are respectively electrically connected to the first data line 120 and the second data line 130. Accordingly, the first voltage and the second voltage can be output from a same driving chip which can be a source driving chip of the display panel. Under this configuration, the relative values of the first voltage and the second voltage can be adjusted for achieving the driving electric field alternating in positive polarity and negative polarity. In addition, a maximum variance between the first voltage and the second voltage, i.e. the maximum driving electric field provided by the pixel structure 100, can be a greatest voltage difference that the driving chip can bear. When the greatest voltage difference that the driving chip can bear is 10 volt, the maximum variance between the first voltage and the second voltage as well as the maximum driving electric field provided by the pixel structure 100 can be as large as 10 volt. When the greatest voltage difference that the driving chip can bear is larger than 10 volt, the maximum variance between the first voltage and the second voltage as well as the maximum driving electric field provided by the pixel structure 100 can be greater than 10 volt.

In comparison, the conventional pixel structure provides a driving electric field for driving the display medium by the difference between the voltage the driving chip output to the pixel electrode and a predetermined common voltage. Owing that the common voltage is a fixed value, the maximum value of the driving electric field provided by the conventional pixel structure is about half of the maximum voltage difference the driving chip can bear for achieving the driving electric field alternating in positive polarity and negative polarity. For example, when the driving chip can bear a voltage ranging from 0 volt to 10 volt and the common voltage is 5 volt, the value of the maximum driving electric field provide by the conventional pixel structure is merely 5 volt which is half to the value of the maximum driving electric field provided by the pixel structure 100 according to the present embodiment.

In one embodiment, a material with greater dielectric constant such as the blue phase liquid crystal material used as the display medium usually requires greater driving electric field, larger than 10 volt, for example. If a conventional pixel structure is adopted, the driving electric field provided by the conventional pixel structure is insufficient for driving the display medium because of the restriction of the current driving chip. Therefore, a new driving chip is bought or developed for achieving greater driving electric field, which causes the increase of the cost. Nevertheless, if the pixel structure 100 according to the present embodiment is adopted, the driving electric field provided by the pixel structure 100 is sufficient for driving the display medium with no need of a new driving chip. It is noted that the driving electric field provided by the pixel structure 100 according to the present embodiment can achieve the required value according to the design requirement. Therefore, the pixel structure 100 in the present embodiment is capable of driving various display media without modifying the driving chip, which is conducive to reduce the cost for buying or developing the new driving chip.

In the present embodiment, the common electrode 180 can be formed by a rectangular electrode pattern located under the first pixel electrode 160 and the second pixel electrode 170. In addition, the third voltage of the common electrode 180 can be different from the first voltage or the second voltage. In one embodiment, the third voltage can be located between the first voltage and the second voltage or be identical to the average of the first voltage and the second voltage. Accordingly, the common electrode 180 and the first pixel electrode 160 can construct a first storage capacitance and the common electrode 180 and the second pixel electrode 170 can construct a second storage capacitance.

Furthermore, when the pixel structure 100 displays an image, the first storage capacitance and the second storage capacitance are conducive to stabilize the first voltage of the first pixel electrode 160 and the second voltage of the second pixel electrode 170. The pixel structure 100 may be characterized by favorable display stability. In the present embodiment, the common electrode 180 can be fabricated by transparent conductive material, so that the display aperture of the pixel structure 100 is not negative effected by the common electrode 180 disposed under the first pixel electrode 160 and the second electrode 170.

In other words, the pixel structure 100 of this embodiment can have the first storage capacitance and the second storage capacitance for achieving stable display quality without having negative influence on the display aperture. The common electrode 180 is disposed under the first pixel electrode 160 and the second pixel electrode 170 in the manner of covering the areas of the first pixel electrode 160 and the second pixel electrode 170. Therefore, the capacitance coupling effect generated between the common electrode 180 and the first pixel electrode 160 is increased with the enlarged overlapped area of the common electrode 180 and the first pixel electrode 160. Similarly, the capacitance coupling effect generated between the common electrode 180 and the second pixel electrode 170 is increased with the enlarged overlapped area of the common electrode 180 and the second pixel electrode 170. Under this configuration, the pixel structure 100 can have enough storage capacitance for stabilizing the voltages of the first pixel electrode 160 and the second pixel electrode 170 even though the pixel structure 100 is used for driving the display medium having high dielectric constant.

In detail, the pixel structure 100 further includes a common line 190 electrically connected to the common electrode 180 and substantially parallel to the scan line 110, wherein the common line 190 divides the pixel structure 100 into two alignment areas I and II. In this embodiment, the first pixel electrode 160 and the second pixel electrode 170 are formed by specific patterns so as to define the required alignment directions in the alignment areas I and II.

The first pixel electrode 160 and the second pixel electrode 170 respectively includes a plurality of first stripe portions 162 and a plurality of second stripe portions 172. An extending direction of a part of the first stripe portions 162 located in the alignment area I is different from an extending direction of the other part of the first stripe portions 162 located in the alignment area II. An extending direction of a part of the second stripe portions 172 located in the alignment area I is different from an extending direction of the other part of the second stripe portions 172 located in the alignment area II. Moreover, the first stripe portions 162 and the second stripe portions 172 are arranged alternatively. The first stripe portions 162 and the second stripe portions 172 located in the alignment area I are, for example, extended in the same direction and alternatively arranged with each other. In the alignment area I, given the extension direction of the scan line 110 serves as a basis line for conducting a clockwise measurement, the first stripe portions 162 and the scan line 110 can form a 45-degree included angle therebetween, and the second stripe portions 172 and the scan line can also form a 45-degree included angle therebetween. The first stripe portions 162 and the second stripe portions 172 located in the alignment area II are, for example, extended in the same direction and alternatively arranged with each other. In the alignment area II, given the extension direction of the scan line 110 serves as a basis line for conducting a clockwise measurement, the first stripe portions 162 and the scan line 110 can form a 135-degree included angle therebetween, and the second stripe portions 172 and the scan line can also form a 135-degree included angle therebetween. Note that the previous angles are exemplary, while the present invention is not limited thereby. In other embodiments, the scope of the invention can be achieved when the first stripe portions 162 and the second stripe portions 172 are configured for defining different alignment directions in the alignment areas I and II.

Furthermore, the first pixel electrode 160 further includes a first longitudinal connecting portion 164 and two first transversal connecting portions 166A and 166B. The present embodiment takes two first transversal connecting portions 166A and 166B as an example. In other embodiments, the first transversal connecting portion can be only one. The first longitudinal connecting portion 164 is located between the first stripe portions 162 and the first data line 120 and substantially parallel to the first data line 120. The first transversal connecting portions 166A and 166B are connected to the first longitudinal connecting portion 164 and substantially parallel to the scan line 110. A part of the first stripe portions 162 is connected to the first longitudinal connecting portion 164 and the other part of the first stripe portions 162 is connected to the first transversal connecting portions 166A and 166B. The first transversal connecting portion 166A is located at a side of the first stripe portions 162 adjacent to the scan line 110 and the first transversal connecting portion 166B is located at a side of the first stripe portions 162 away from the scan line 110. That is, the first longitudinal connecting portion 162 and the first transversal connecting portions 166A and 166B together form a U-shaped pattern and all of the first stripe portions 162 are located within the region surrounding by the U-shaped pattern.

The second pixel electrode 170 further includes a second longitudinal connecting portion 174 and a second transversal connecting portion 176. The second longitudinal connecting portion 174 is located between the second stripe portions 172 and the second data line 130 and substantially parallel to the second data line 130. The second transversal connecting portion 176 is connected to the second longitudinal connecting portion 174, substantially parallel to the scan line 110, and overlapped with the common line 190. A part of the second stripe portions 172 is connected to the second longitudinal connecting portion 174 and the other part of the second stripe portions 172 is connected to the first transversal connecting portion 176.

In the present embodiment, the common line 190 formed by a straight line is taken as an example. In other embodiments, the common line 190 can be formed by H-shaped pattern. Herein, the common line 190 can have a first branch (not shown) and a second branch (not shown) which respectively overlapped with the first longitudinal connecting portion 164 and the second longitudinal connecting portion 174. Specifically, in the pixel structure 100 depicted in FIG. 1, the disposition sequence of the components is not limited. The pixel structure 100 can be fabricated by several manufacturing sequences, wherein the disposition sequence of the components is varied with the manufacturing sequences. Accordingly, several fabricating methods of the pixel structure and the cross sections of the pixel structures made by different methods are illustrated in the follownng embodiments.

Figure 2A:
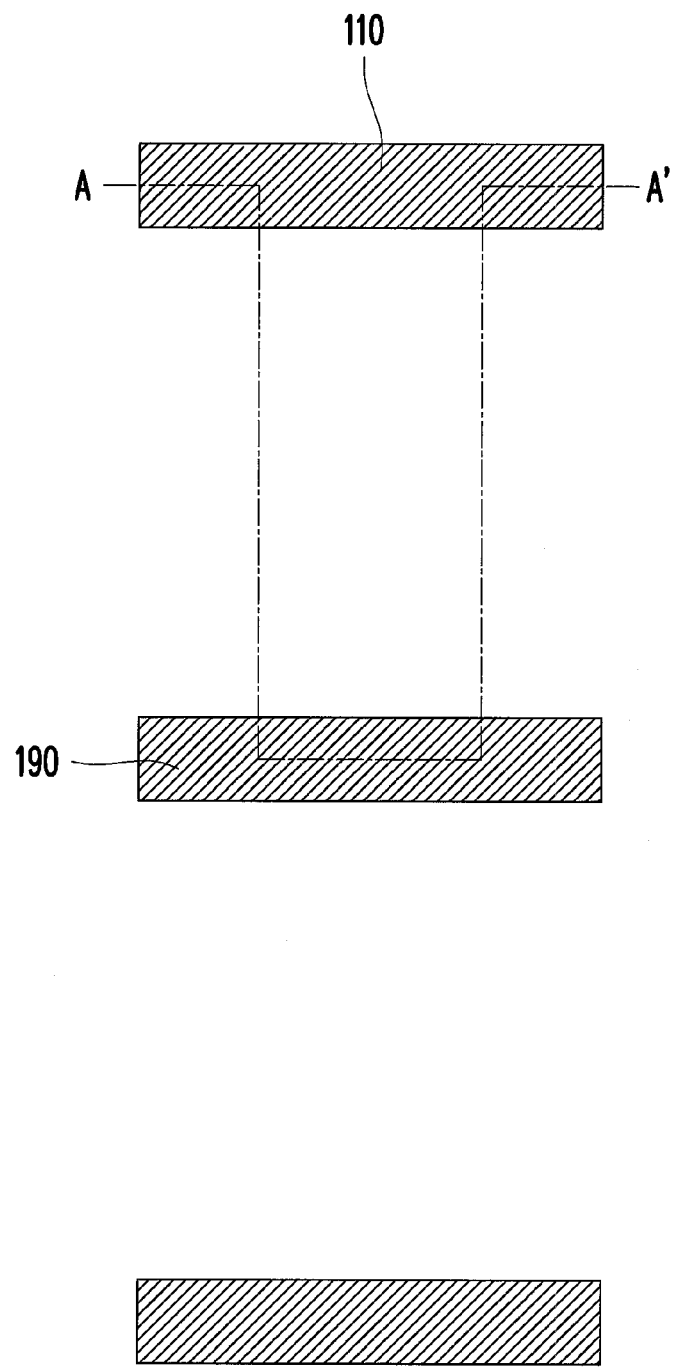
FIGS. 2A through 2F depict a method for fabricating a pixel structure according to a second embodiment of the present invention.
Figure 2B:
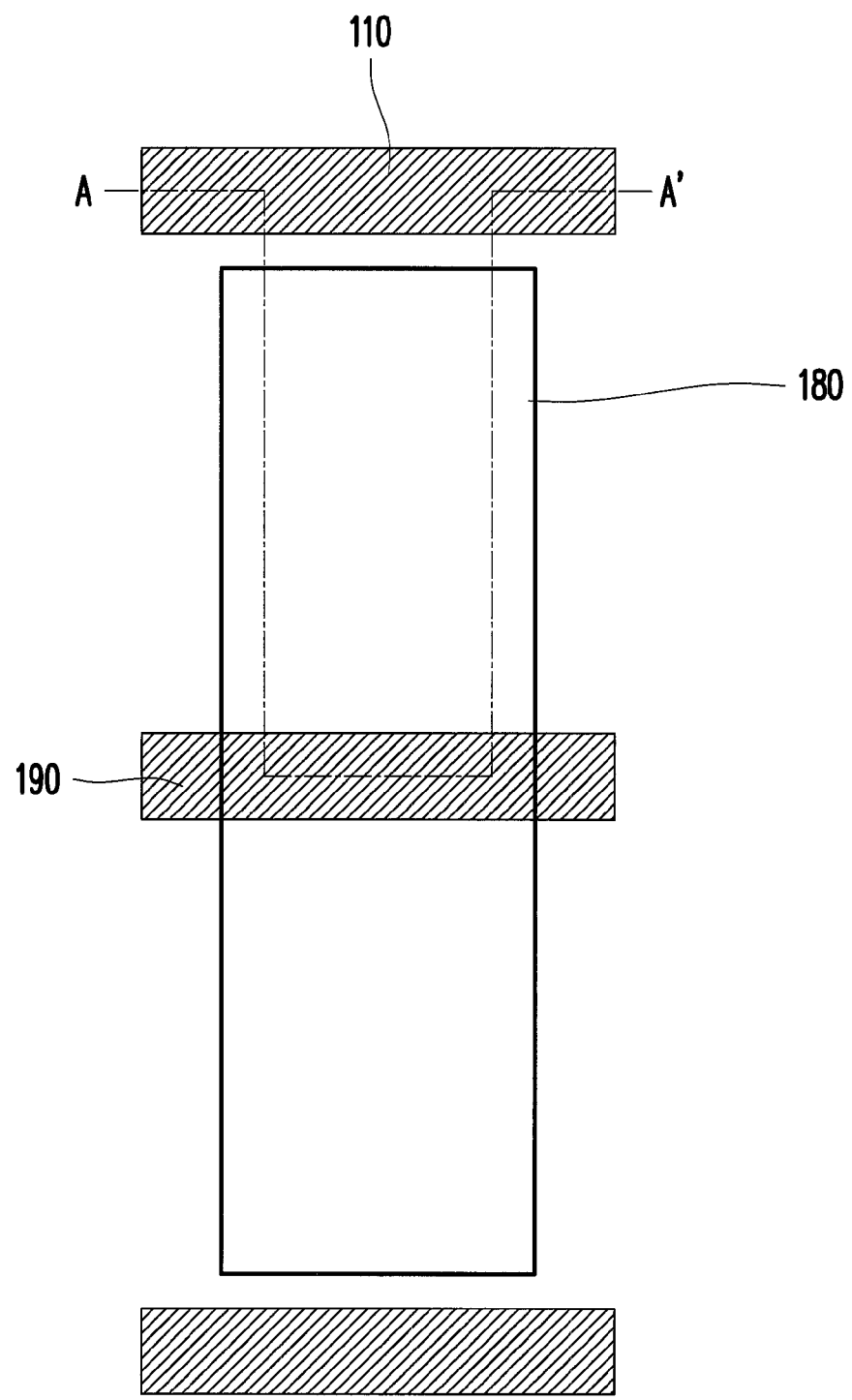
Figure 2C:
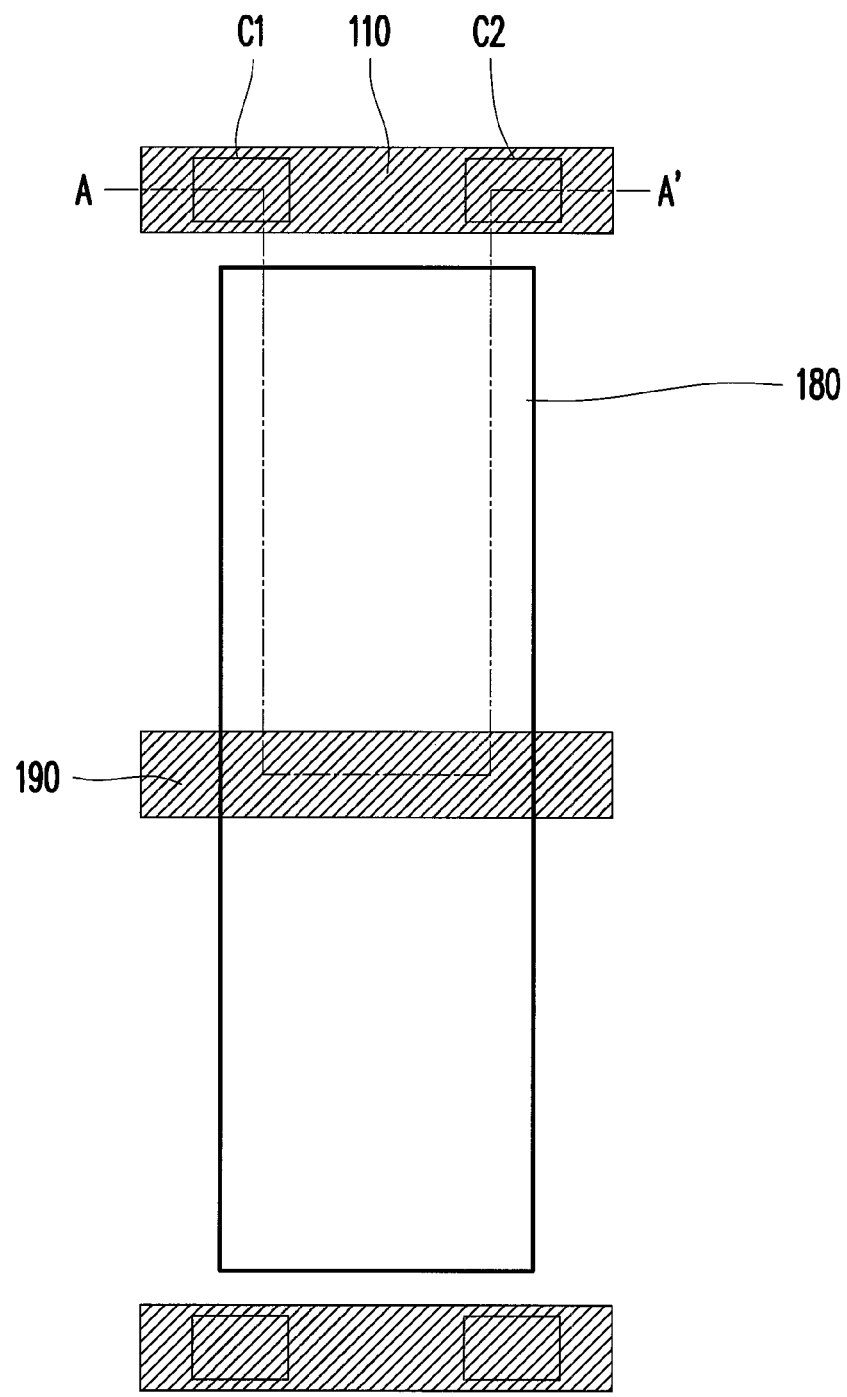
Figure 2D:
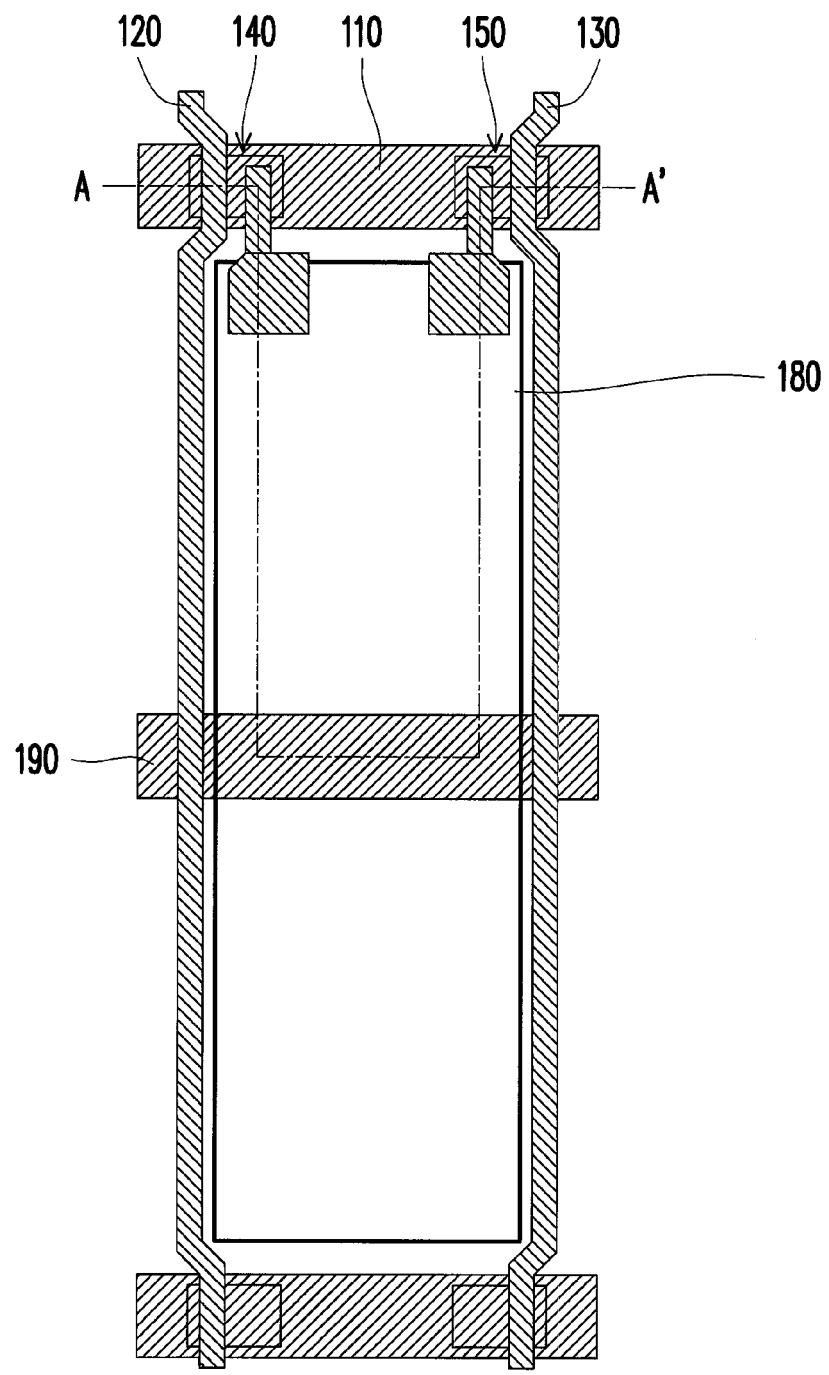
Figure 2E:
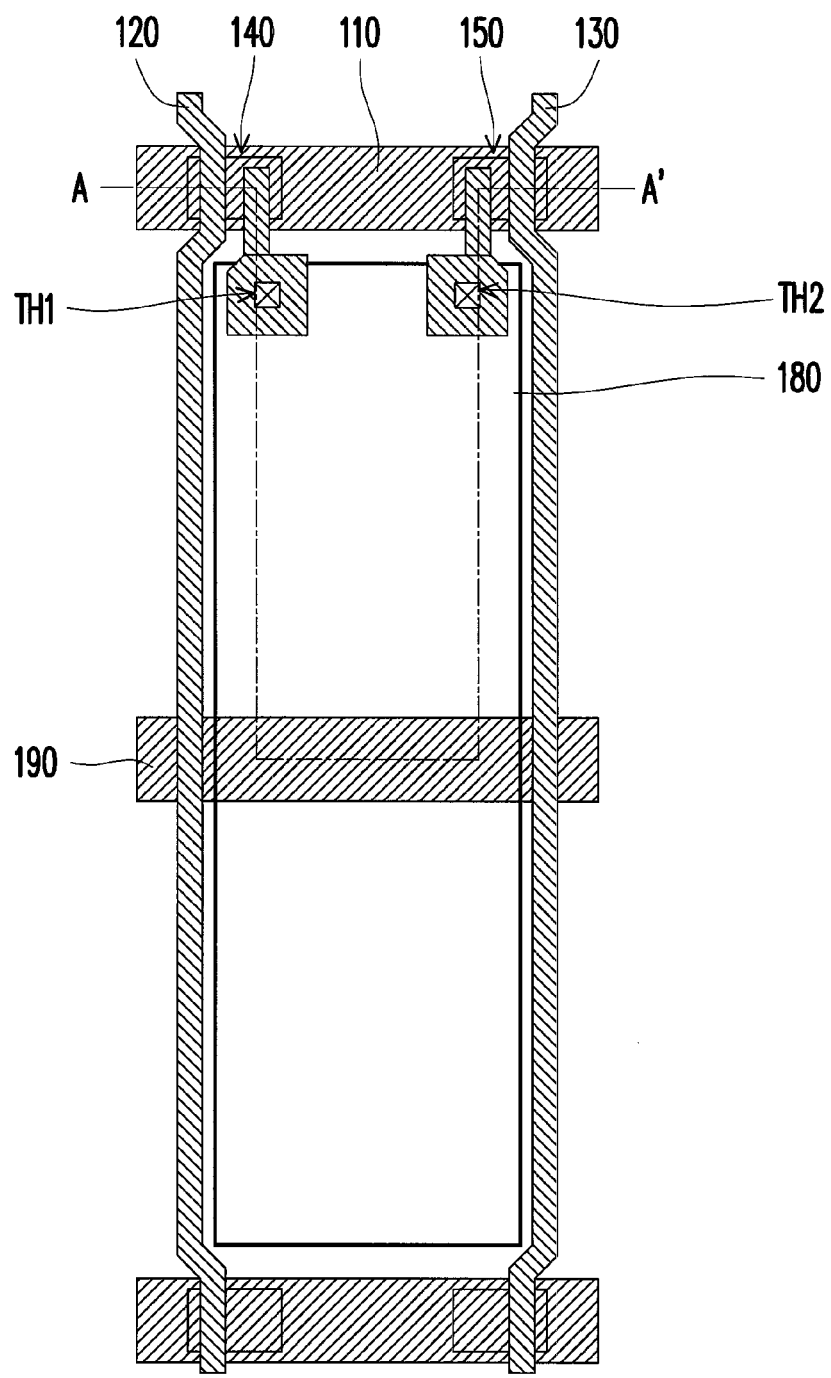
Figure 2F:
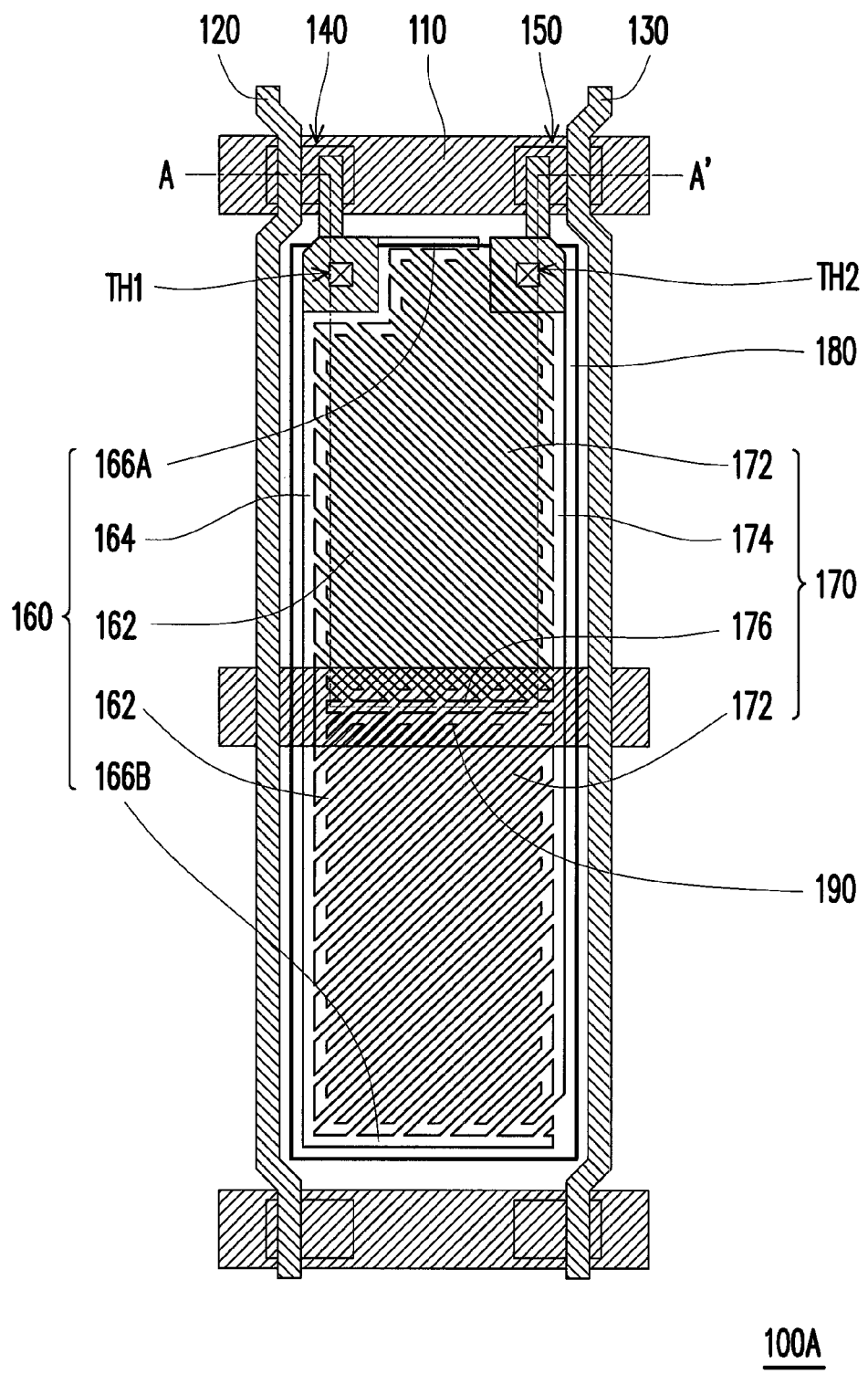
Figure 3:
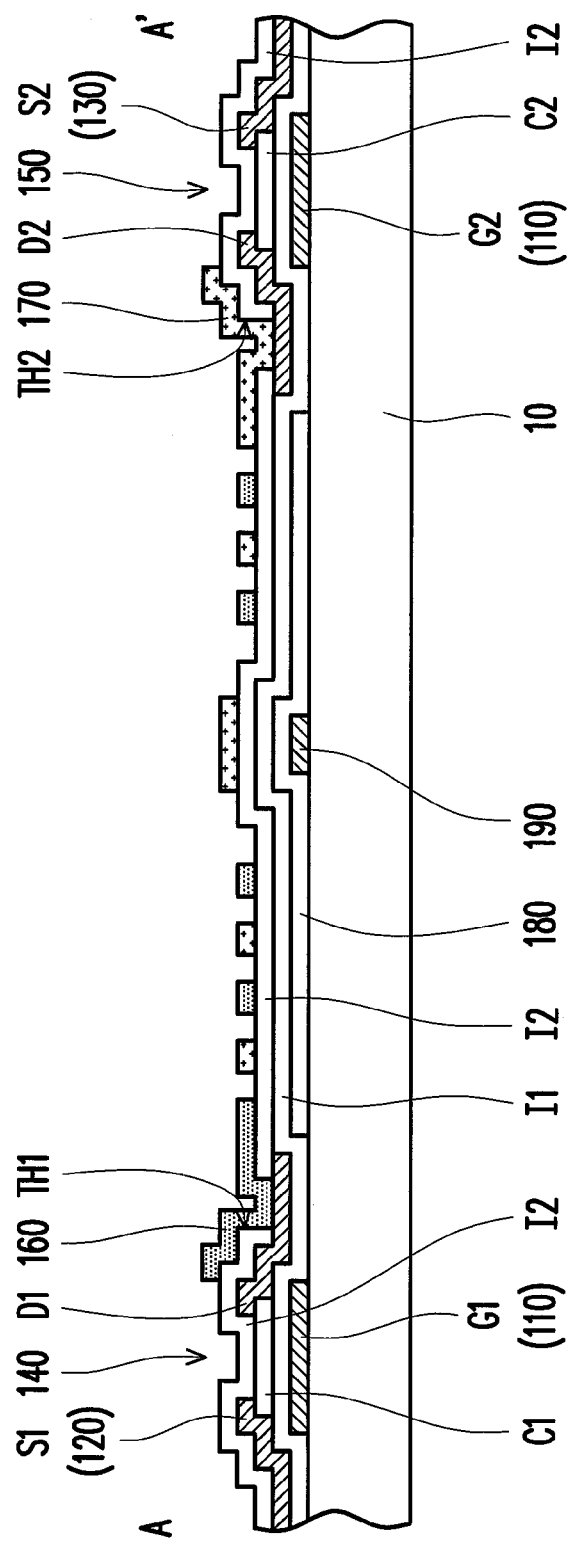
FIG. 3 schematically illustrates a cross-sectional view of the pixel structure depicted in FIG. 2F along the line A-A'.

FIGS. 2A through 2F depict a method for fabricating a pixel structure according to a second embodiment of the present invention and FIG. 3 schematically illustrates a cross-sectional view of the pixel structure depicted in FIG. 2F along the line A-A'. Referring to FIG. 3, the pixel structure 100A is disposed on a substrate 10, for example. In the pixel structure 100A, the first active device 140 can include a gate G1, a source S1, and a drain D1 and the second active device 150 can include a gate G2, a source S2, and a drain D2. According to the embodiment, the gate G1 and the gate G2 are respectively two portions of the scan line 110, the source S1 is a portion of the first data line 120, and the source S2 is a portion of the second data line 130. Nevertheless, in other embodiments, the gate G1 and the gate G2 can be respectively formed by a pattern extended from the scan line 110, the source S1 can be formed by a pattern extended from the first data line 120, and the source S2 can be formed by a pattern extended from the second data line 130. In addition, the pixel structure 100A further has insulation layers I1 and I2.

With reference to FIG. 2A and FIG. 3 together, a method for manufacturing the pixel structure 100A includes firstly forming the scan line 110 and the common line 190 on the substrate 10. According to the present embodiment, the scan line 110 and the common electrode line 190 can be fabricated by the same material and the scan line 110 and the common line 190 can be arranged in parallel.

Thereafter, with reference to FIG. 2B and FIG. 3 simultaneously, the common electrode 180 is formed on the common line 190, wherein the common electrode 180 can be a rectangular conductive pattern and a material of the common electrode 180 can be a transparent conductive material such as indium tin oxide (ITO), indium zinc oxide (IZO), etc. Subsequently, a complete insulation layer I1 is formed on the common electrode 180 and the scan line 110.

With reference to FIG. 2C and FIG. 3, channel layers C1 and C2 are formed on the insulation layer I1. The channel layers C1 and C2 are, for instance, located above the scan line 110 to define the locations of the first active device 140 and the second active device 150. Herein, a portion of the scan line 110 corresponding to the channel layer C1 can be served as the gate G1 and another portion of the scan line 110 corresponding to the channel layer C2 can be define as the gate G2.

Next, with reference to FIG. 2D and FIG. 3, the first data line 120, the second data line 130, the sources S1 and S2, and the drains D1 and D2 are formed on the insulation layer I1 and the channel layers C1 and C2 by using a conductive material layer. The source S1 and the drain D1 are disposed opposite to each other and located above the gate G1 to construct the first active device 140 and the source S2 and the drain D2 are disposed opposite to each other and located above the gate G2 to form the second active device 150. In addition, the source S1 is formed by a portion of the first data line 120 and the source S2 is formed by a portion of the second data line 130.

Then, with reference to FIG. 2E and 3, an insulation layer I2 is formed completely covering the substrate 10, the first active device 140, and the second active device 150. In addition, contact holes TH1 and TH2 are formed in the insulation layer I2 to respectively expose the drains D1 and D2.

Thereafter, with reference to FIG. 2F and FIG. 3, the first pixel electrode 160 and the second pixel electrode 170 are formed on the insulation layer I2, wherein the first pixel electrode 160 is electrically connected to the drain D1 of the first active device 140 through the contact hole TH1 and the second pixel electrode 170 is electrically connected to the drain D2 of the second active device 150 through the contact hole TH2. It is noted that the common electrode 180 is located between the first pixel electrode 160 and the substrate 10 and located between the second pixel electrode 170 and the substrate 10 as shown in FIG. 3. In addition, the common line 190 can be located between the common electrode 180 and the substrate 10. It is for sure that the present invention should not be construed as limited to the embodiments of the present invention.

Figure 4A:
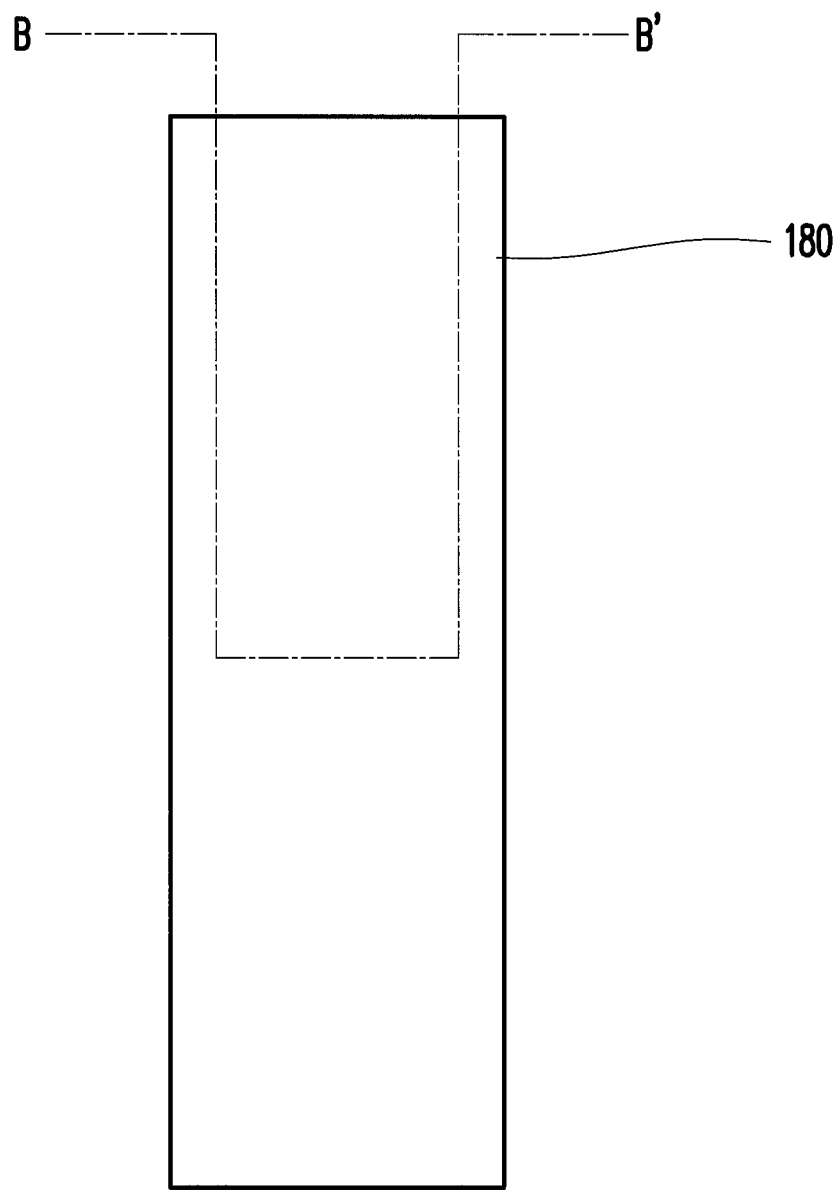
FIGS. 4A through 4F depict a method for fabricating a pixel structure according to a third embodiment of the present invention.
Figure 4B:
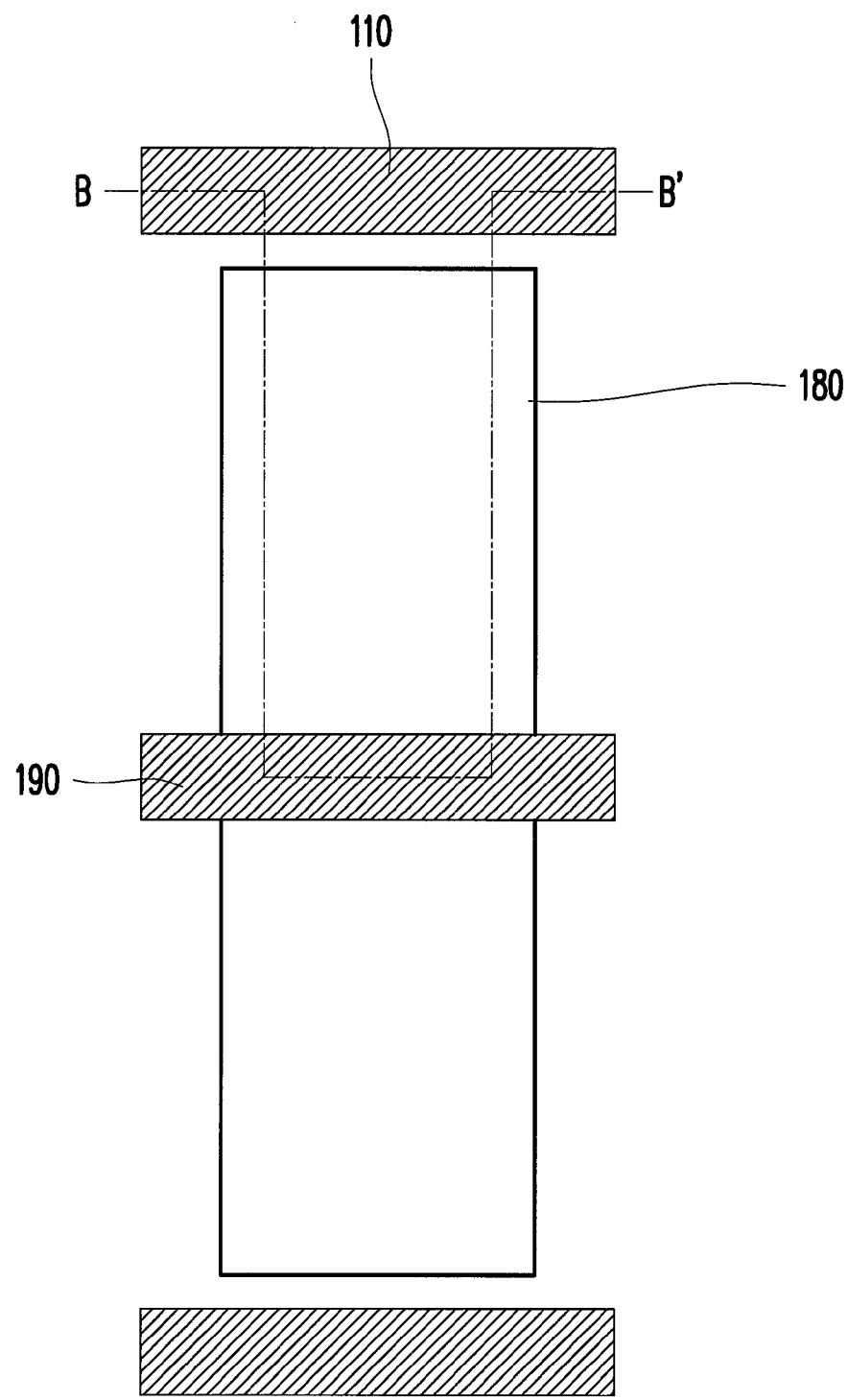
Figure 4C:
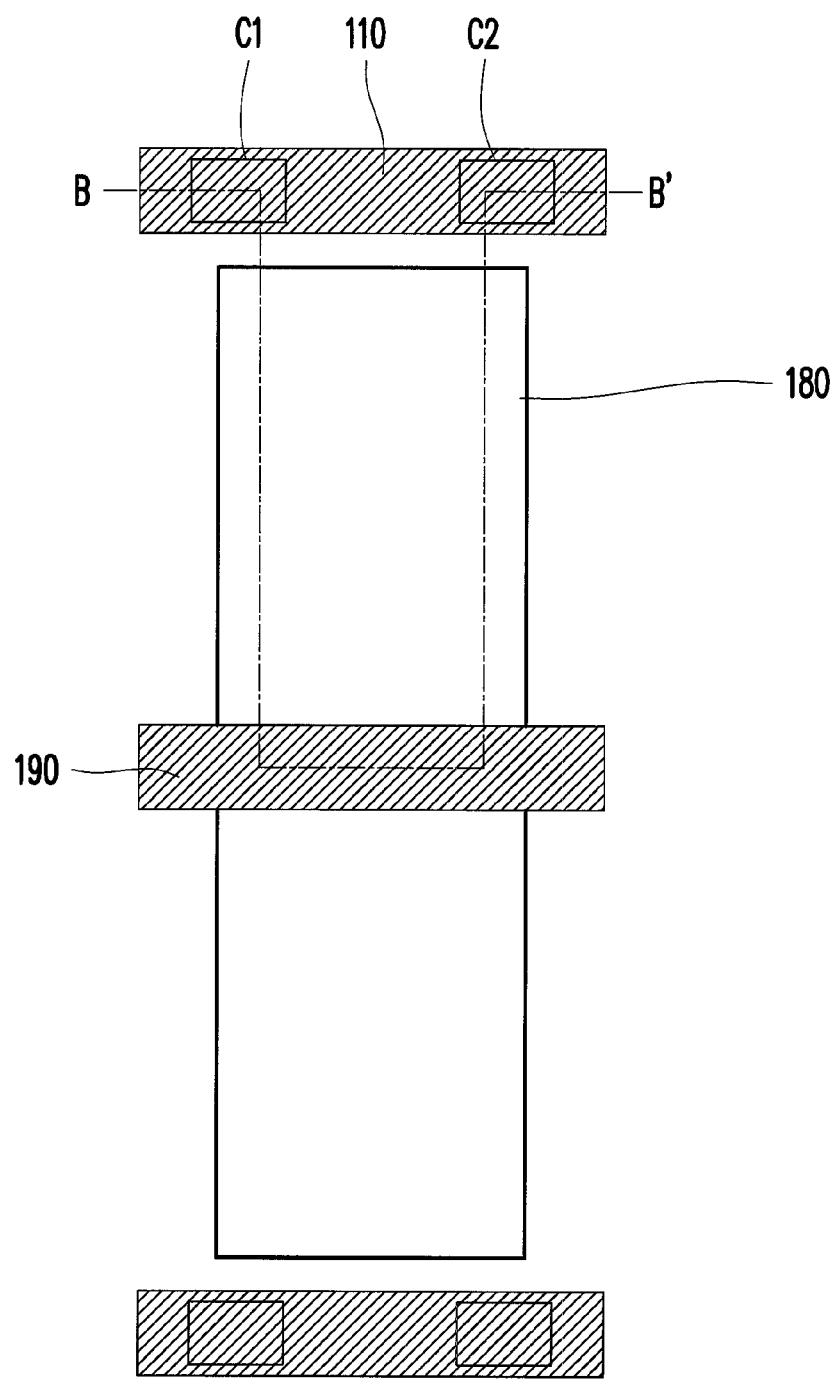
Figure 4D:
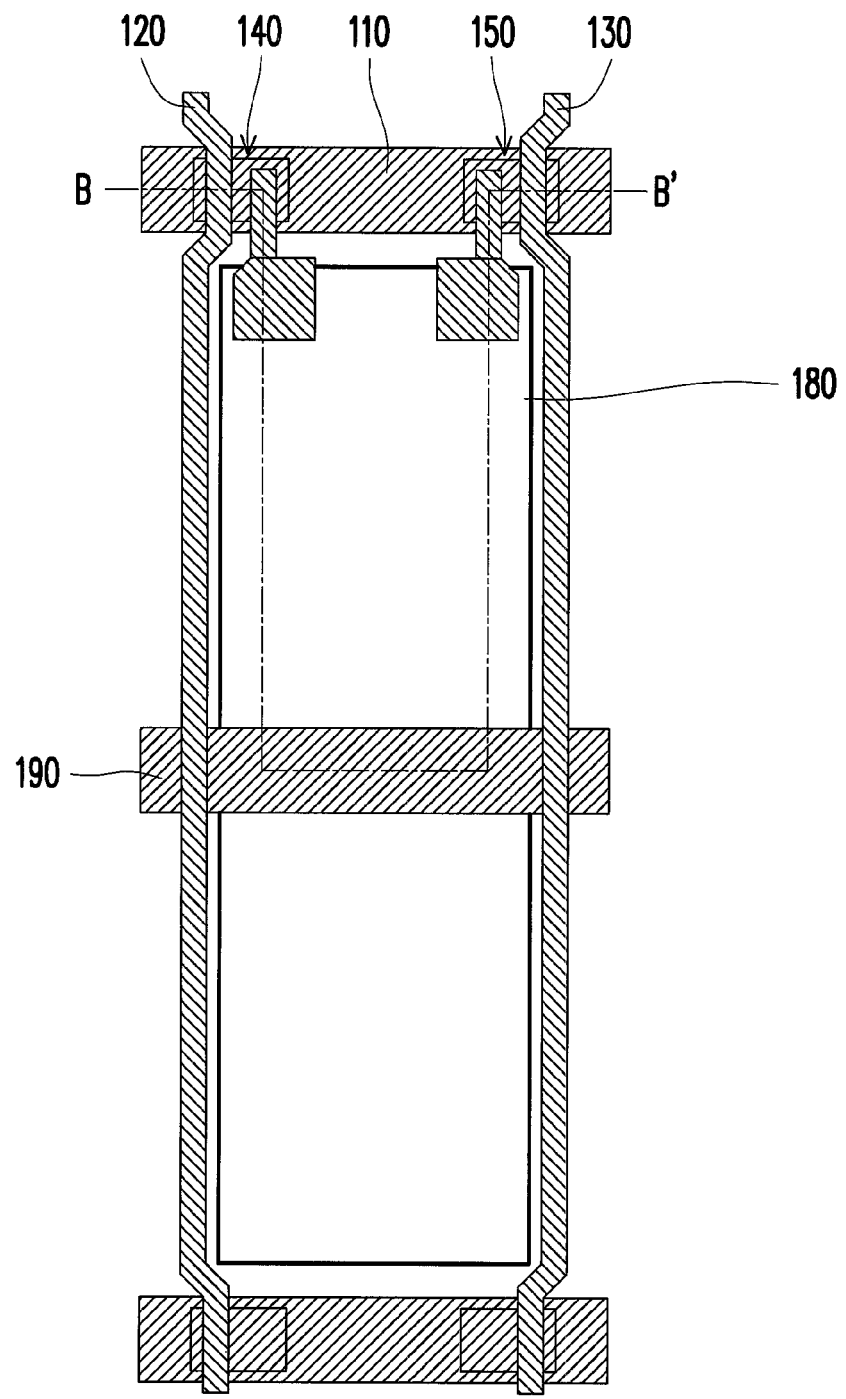
Figure 4E:
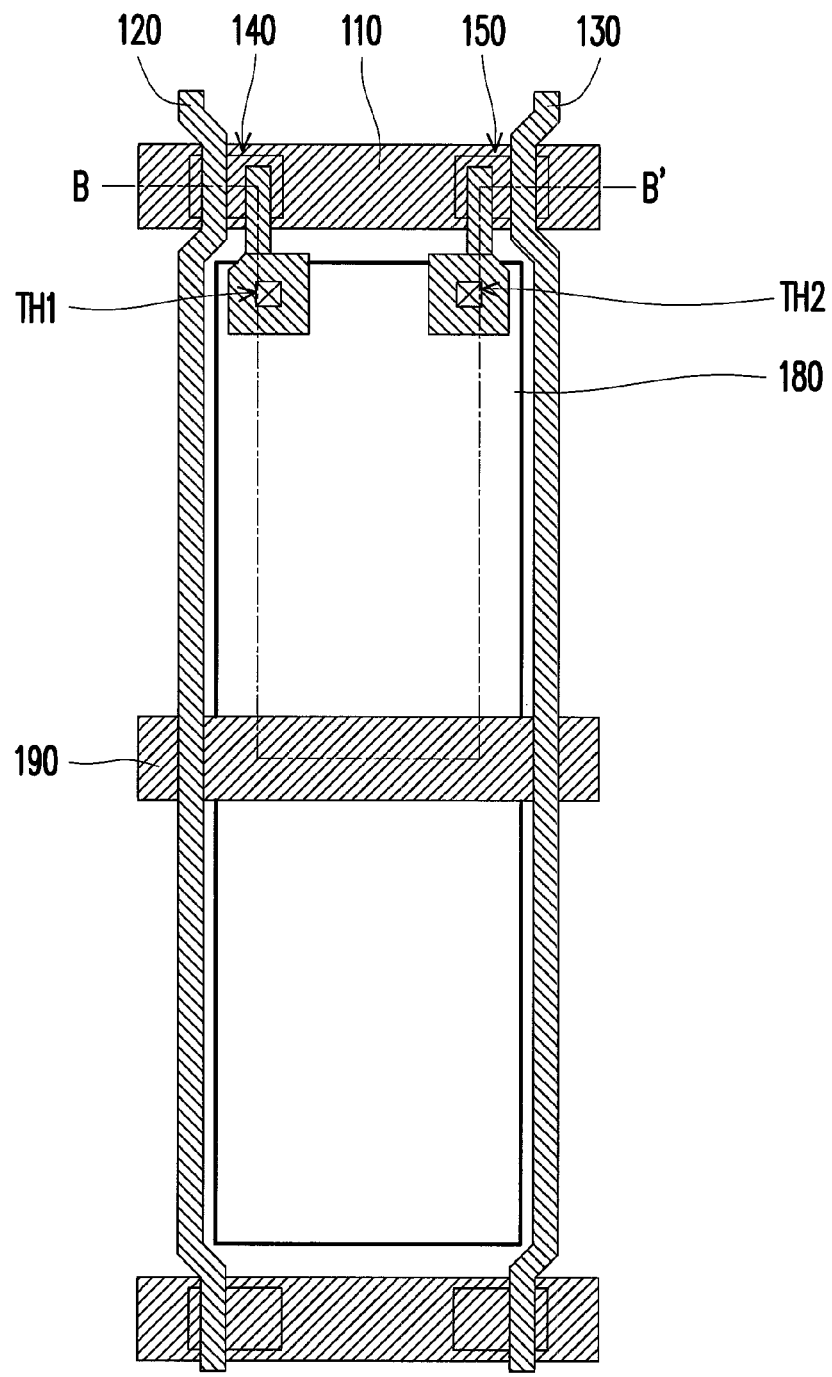
Figure 4F:
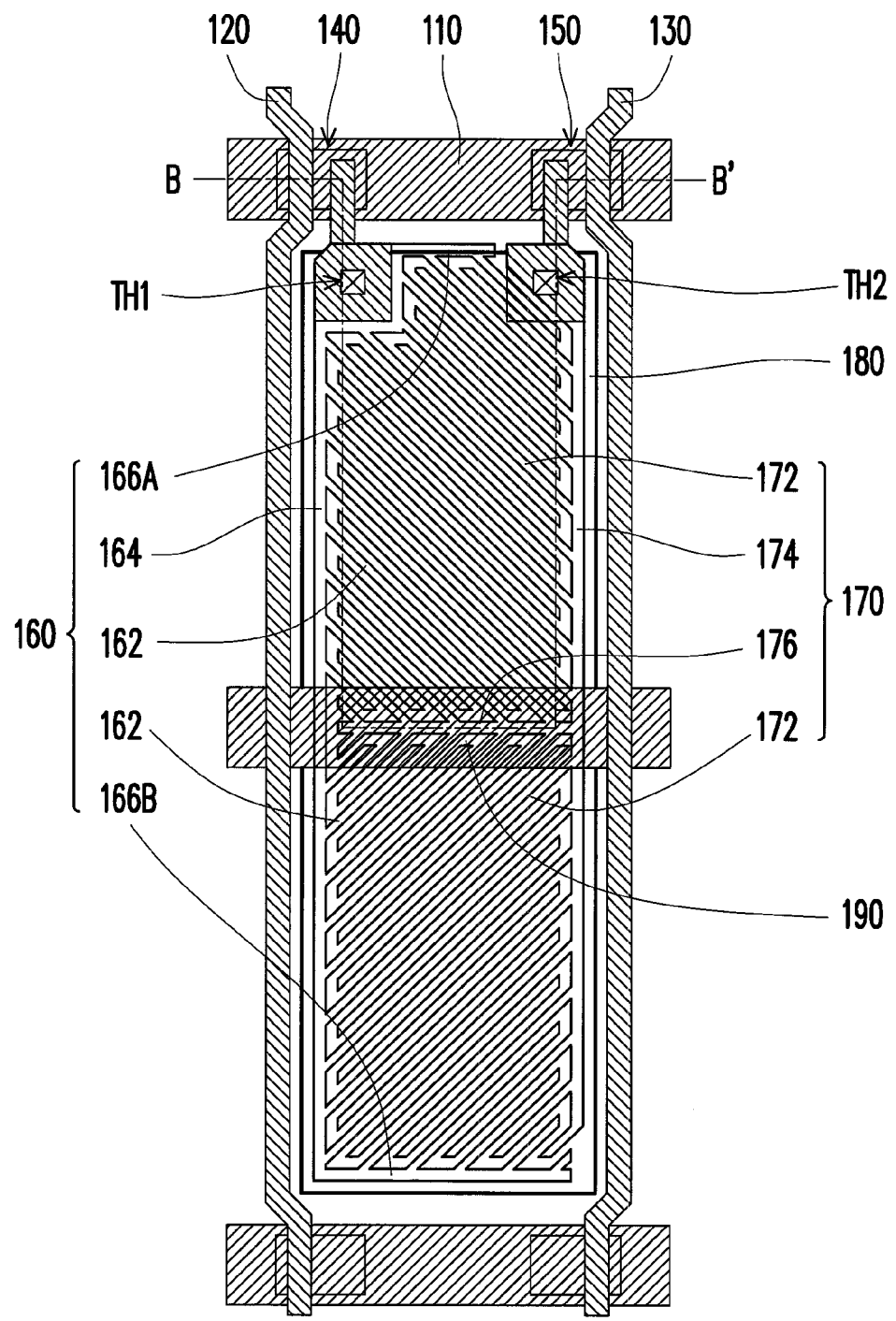
Figure 5:
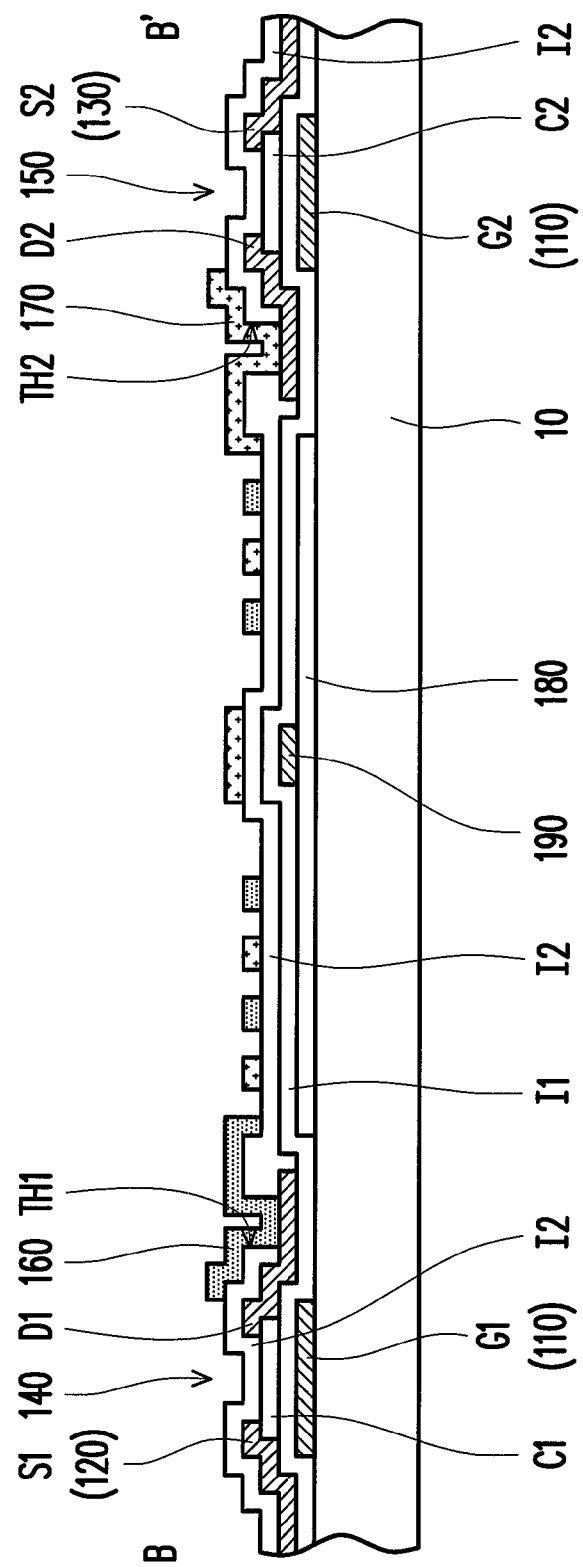
FIG. 5 schematically illustrates a cross-sectional view of the pixel structure depicted in FIG. 4F along the line B-B'.

FIGS. 4A through 4F depict a method for fabricating a pixel structure according to a third embodiment of the present invention and FIG. 5 schematically illustrates a cross-sectional view of the pixel structure depicted in FIG. 4F along the line B-B'. With reference to FIG. 4A and FIG. 5, the difference between the present embodiment and the previous embodiment lies in that the common electrode 180 is firstly formed on the substrate 10 by using a transparent conductive material in the present embodiment. Then, with reference to FIG. 4B and FIG. 5 together, the scan line 110, the common line 190, and the insulation layer I1 are formed on the substrate 10 having the common electrode 180, wherein the scan line 110 and the common line 190 are arranged in parallel, the common line 190 is electrically connected to the common electrode 180, and the insulation layer I1 covers the scan line 110 and the common line 190. With reference to FIG. 4C and FIG. 5, channel layers C1 and C2 are formed on the insulation layer I1, wherein the portions of the scan line 110 corresponding to the channel layers C1 and C2 are defined as the gate G1 and G2, respectively.

Next, with reference to FIG. 4D and FIG. 5, the first data line 120, the second data line 130, the sources S1 and S2, and the drains D1 and D2 are formed on the insulation layer I1 and the channel layers C1 and C2 by using a conductive material layer. Herein, the gate G1, the channel layer C1, the source S1, and the drain D1 together construct the first active device 140 and the gate G2, the channel layer C2, the source S2, and the drain D2 together construct the second active device 150. Then, with reference to FIG. 4E and 5, an insulation layer I2 is formed completely covering the substrate 10, the first active device 140, and the second active device 150. In addition, contact holes TH1 and TH2 are formed in the insulation layer I2 to respectively expose the drains D1 and D2. Afterwards, with reference to FIG. 4F and FIG. 5, the first pixel electrode 160 and the second pixel electrode 170 are formed on the insulation layer I2. The first pixel electrode 160 is electrically connected to the drain D1 of the first active device 140 through the contact hole TH1 and the second pixel electrode 170 is electrically connected to the drain D2 of the second active device 150 through the contact hole TH2. Accordingly, the fabrication of the pixel structure 100B is completed. It is noted that the common electrode 180 can be located between the common line 190 and the substrate 10 according to the present embodiment.

Figure 6A:
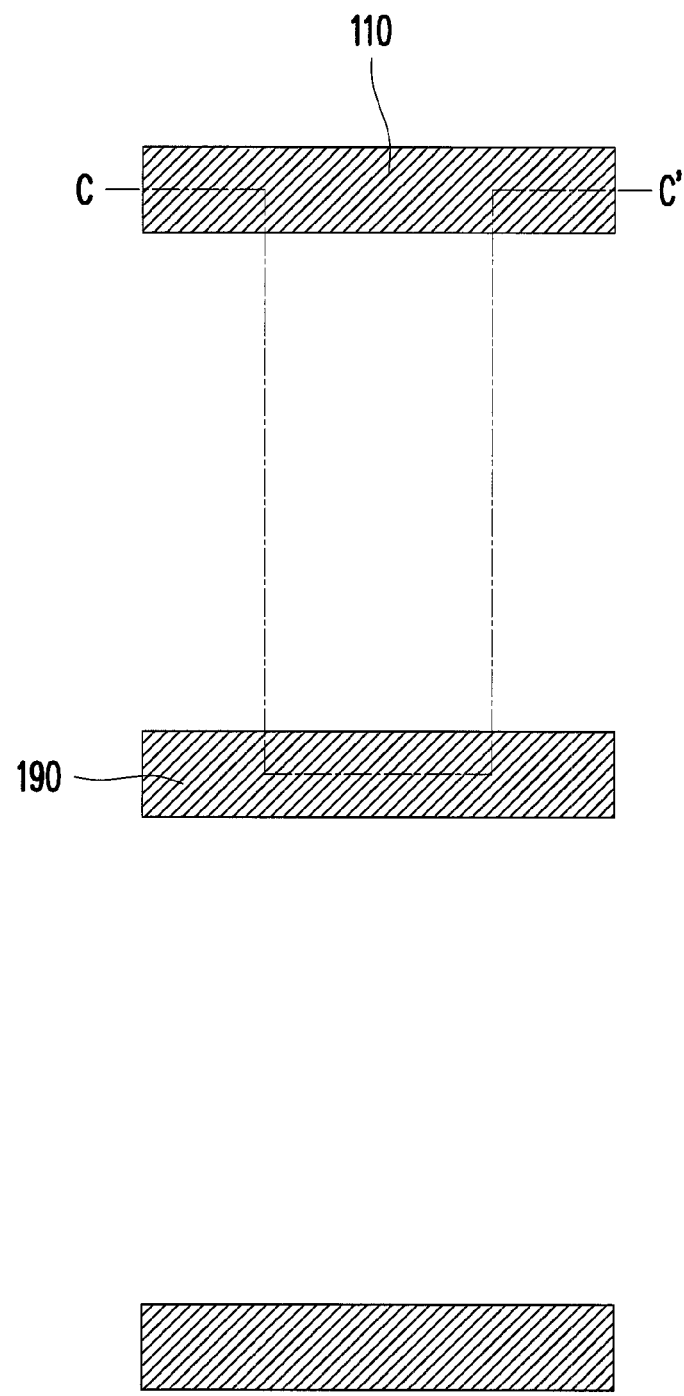
FIGS. 6A through 6F depict a method for fabricating a pixel structure according to a fourth embodiment of the present invention.
Figure 6B:
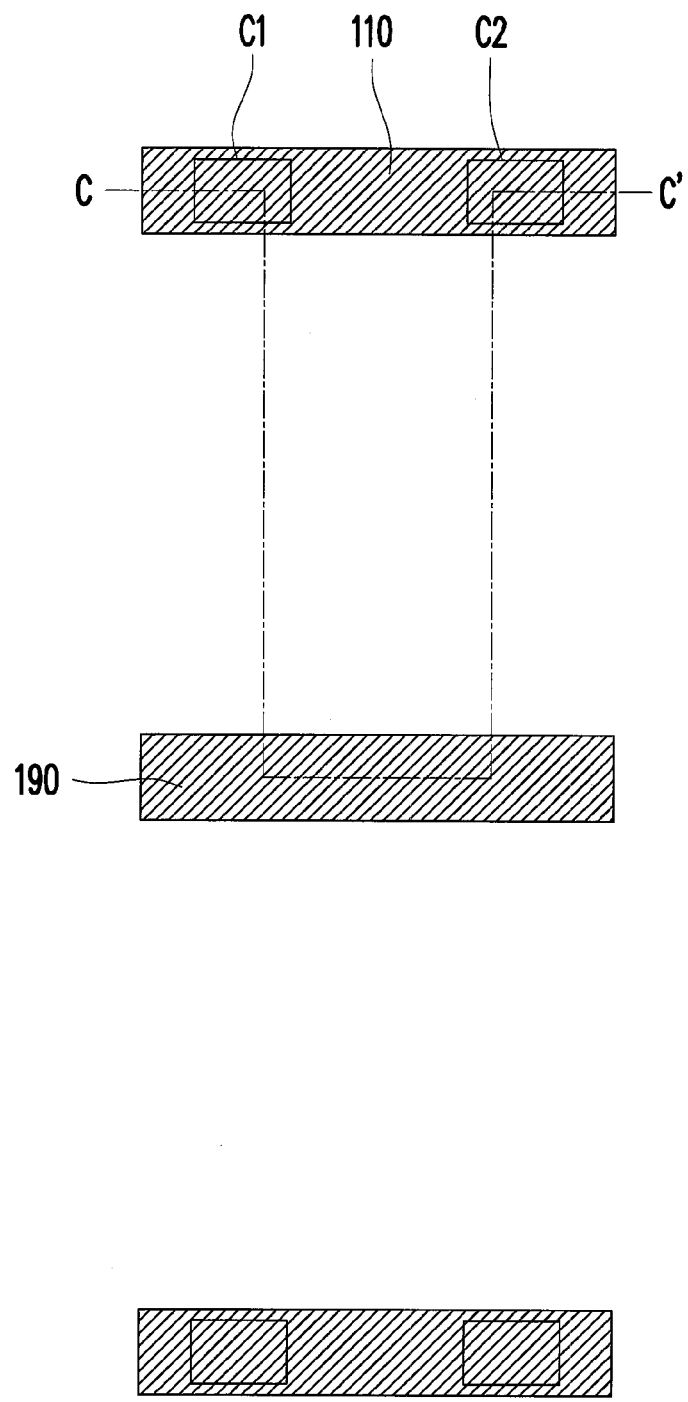
Figure 6C:
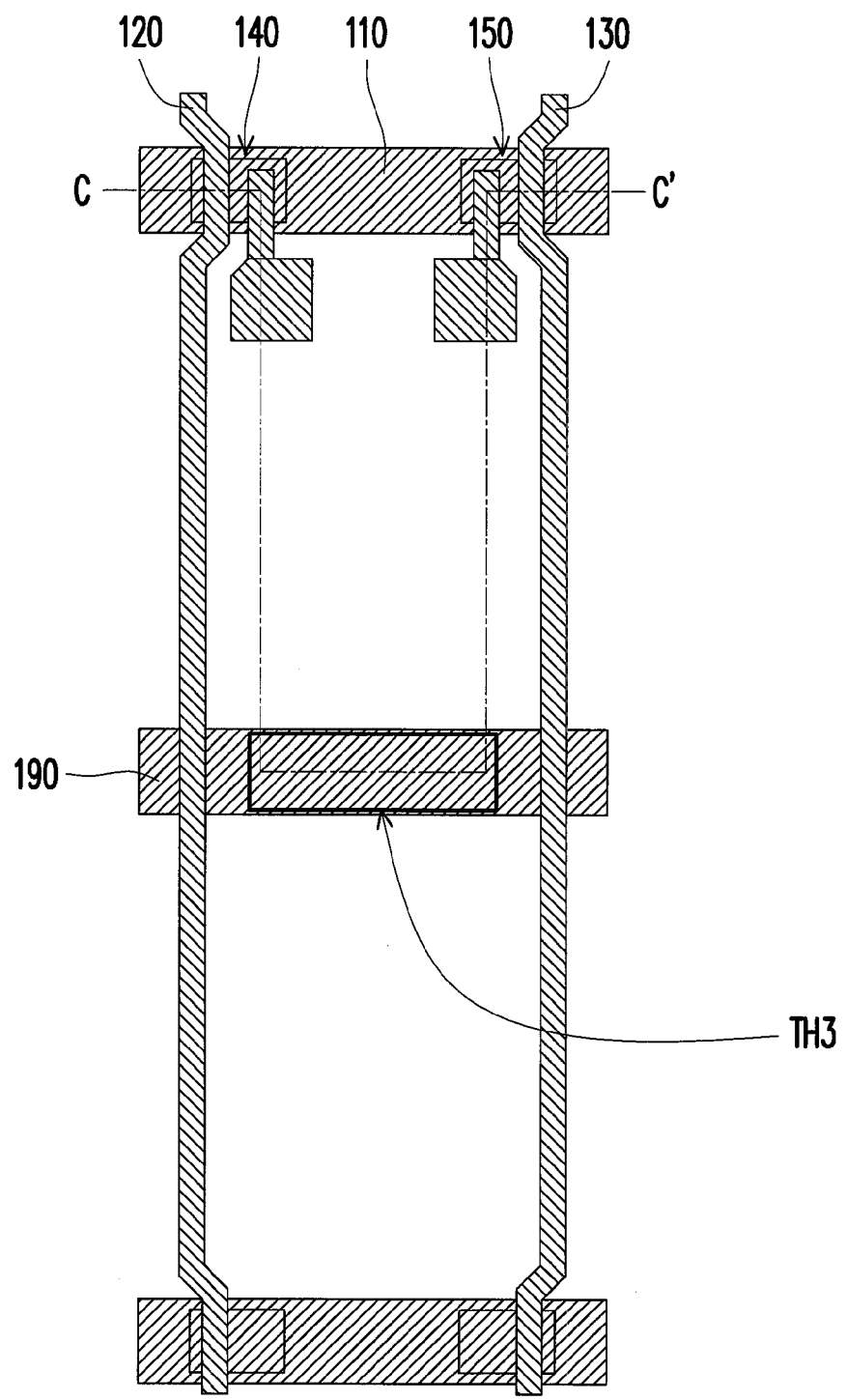
Figure 6D:
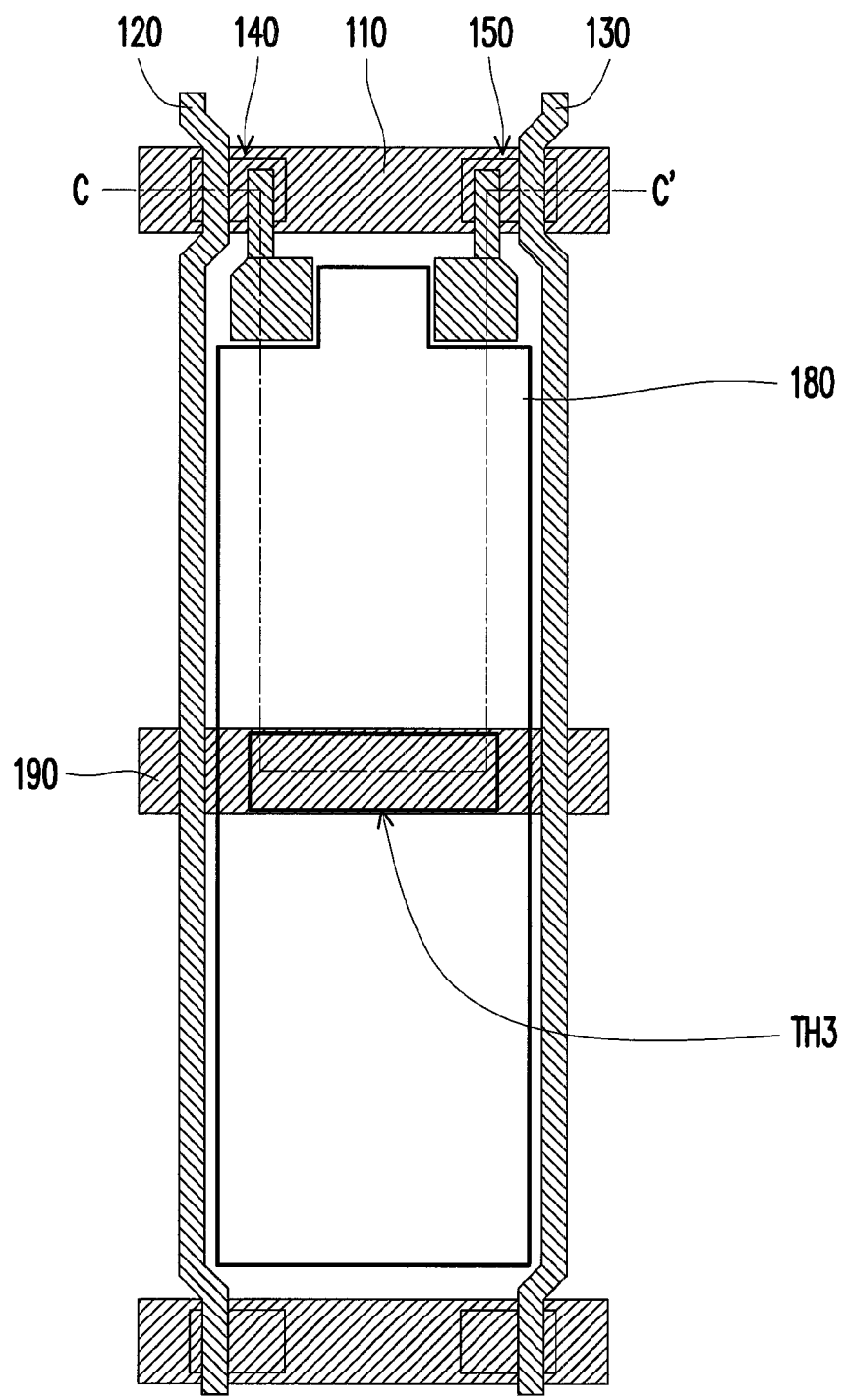
Figure 6E:
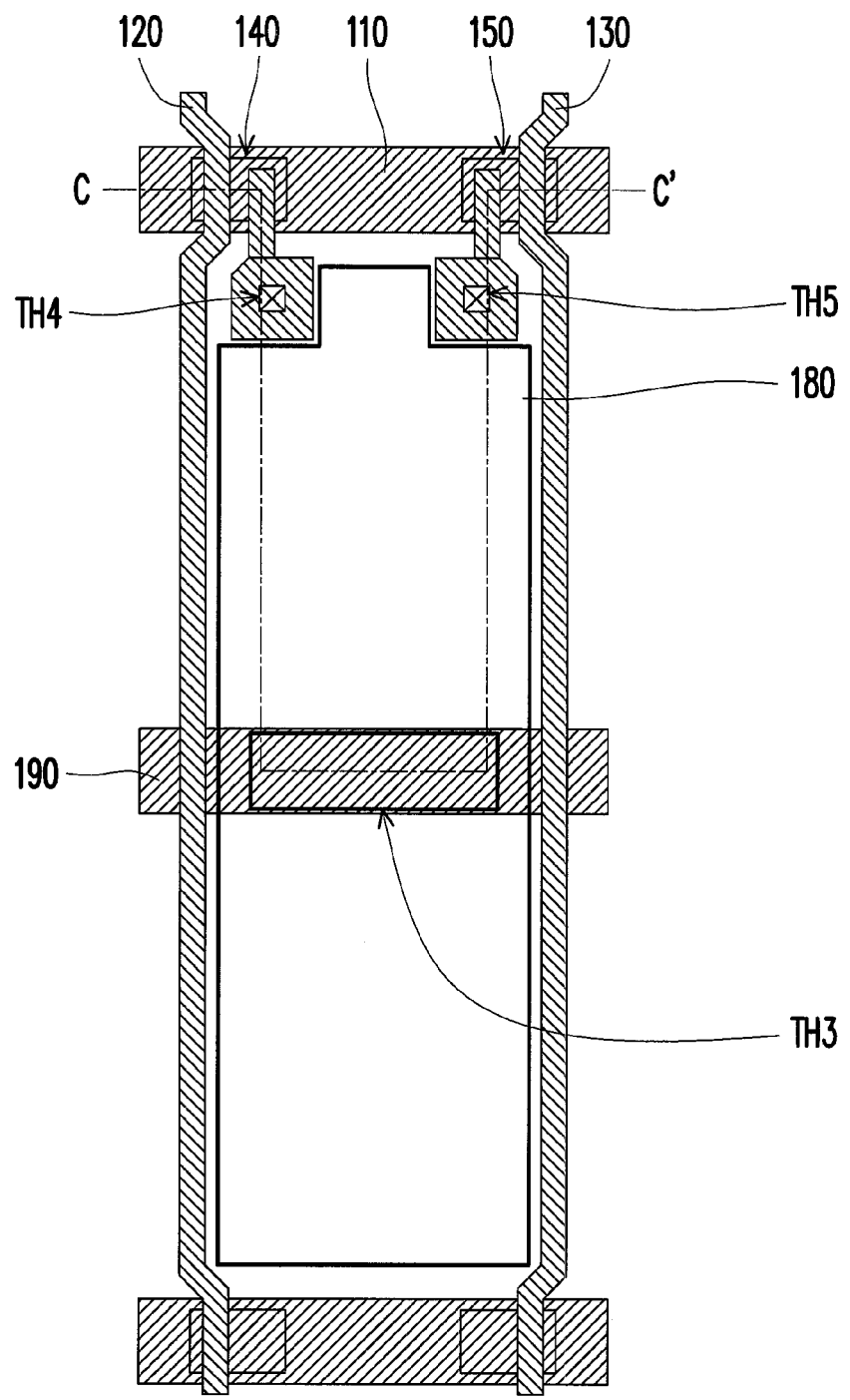
Figure 6F:
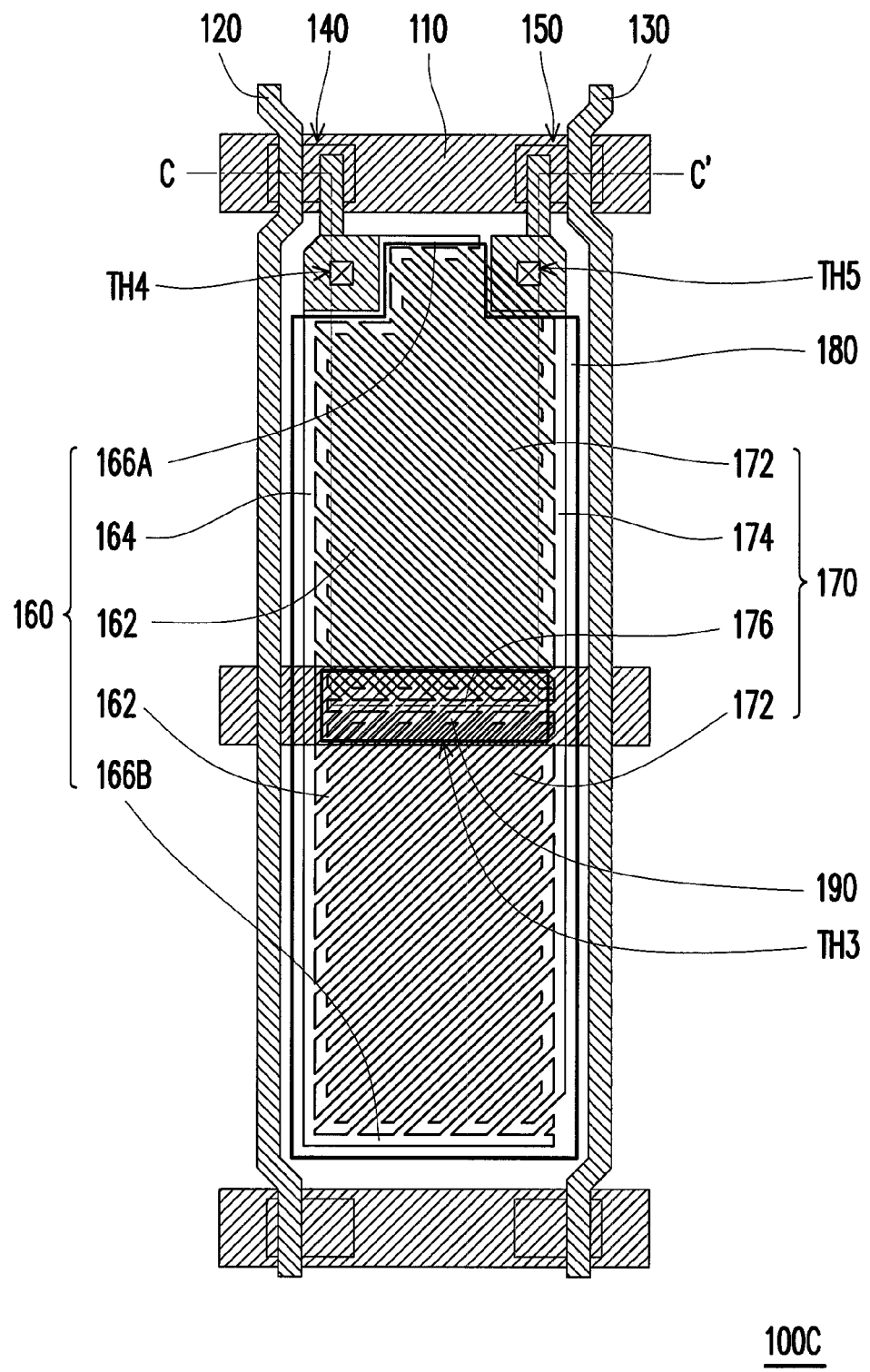
Figure 7:
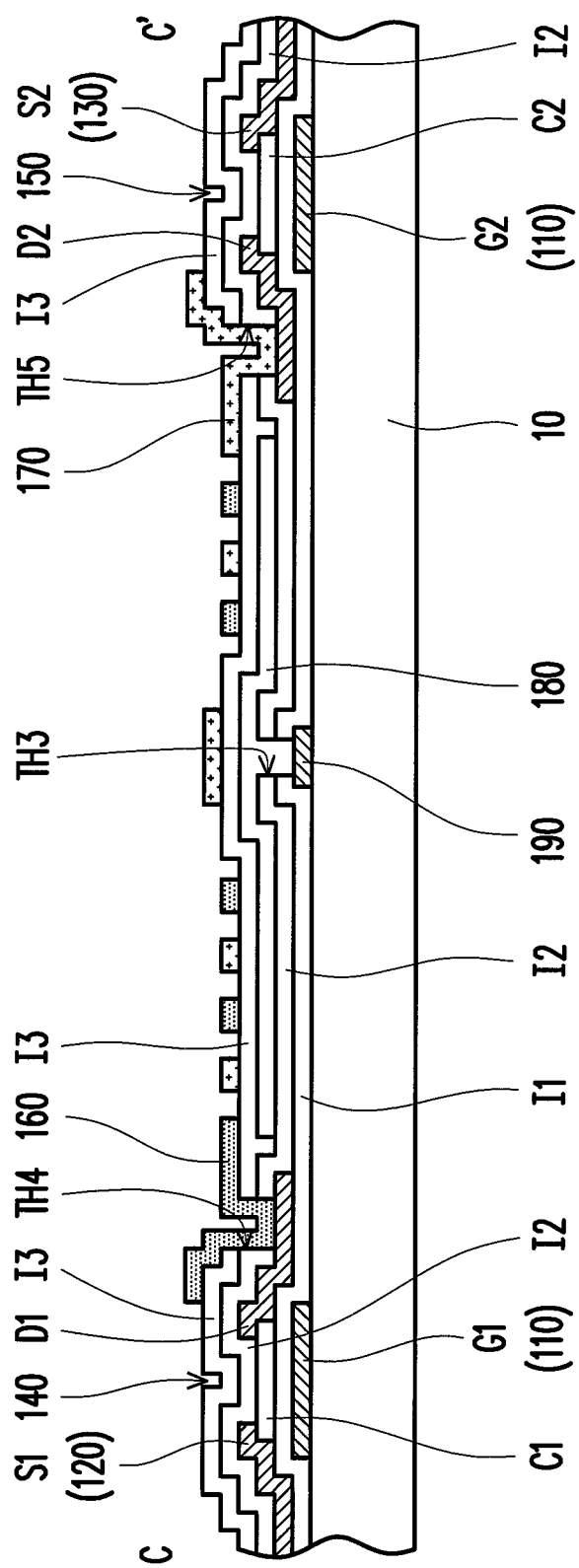
FIG. 7 schematically illustrates a cross-sectional view of the pixel structure depicted in FIG. 6F along the line C-C'.

FIGS. 6A through 6F depict a method for fabricating a pixel structure according to a fourth embodiment of the present invention and FIG. 7 schematically illustrates a cross-sectional view of the pixel structure depicted in FIG. 6F along the line C-C'. With reference to FIG. 6A and FIG. 7, the scan line 110, the common line 190, and the insulation layer I1 are formed on the substrate 10, wherein the scan line 110 is, for example, parallel to the common line 190 and the insulation layer I1 covers the scan line 110 and the common line 190. Next, with reference to FIG. 6B and FIG. 7, channel layers C1 and C2 are formed on the insulation layer I1, wherein the portions of the scan line 110 corresponding to the channel layers C1 and C2 are defined as the gate G1 and G2, respectively. Thereafter, with reference to FIG. 6C and FIG. 7, the first data line 120, the second data line 130, the sources S1 and S2, and the drains D1 and D2 are formed on the insulation layer I1 and the channel layers C1 and C2 by using a conductive material layer. Herein, the gate G1, the channel layer C1, the source S1, and the drain D1 together construct the first active device 140 and the gate G2, the channel layer C2, the source S2, and the drain D2 together construct the second active device 150. In addition, an insulation layer I2 is formed completely covering the substrate 10, the first active device 140, and the second active device 150. Subsequently, a contact hole TH3 is formed and the contact hole TH3 penetrates through the insulation layer I1 and the insulation layer I2 to expose the common line 190.

Afterward, with reference to FIG. 6D and FIG. 7, the common electrode 180 is formed on the insulation layer I2 by using a transparent conductive material, wherein the common electrode 180 is electrically connected to the common line 190 through the contact hole TH3. With reference to FIG. 6E and 7, an insulation layer I3 is formed on the common electrode 180 and the insulation layer I2, wherein the insulation layer I3 also covers the first active device 140 and the second active device 150. Furthermore, contact holes TH4 and TH5 are formed penetrating the insulation layer I2 and the insulation layer I3 to respectively expose the drains D1 and D2. Thereafter, with reference to FIG. 6F and FIG. 7, the first pixel electrode 160 and the second pixel electrode 170 are formed on the insulation layer I3, wherein the first pixel electrode 160 is electrically connected to the drain D1 of the first active device 140 through the contact hole TH4 and the second pixel electrode 170 is electrically connected to the drain D2 of the second active device 150 through the contact hole TH5. Accordingly, the pixel structure 100C is completed, wherein the common electrode 180 is located between the insulation layer I2 and the insulation I3 and the insulation layer I3 is located between the common electrode 180 and the pixel electrodes 160 and 170.

The above embodiments exemplarily depict the cross sections of the pixel structure 100A~100C made by different manufacturing sequences. Note that the previous angles are exemplary, while the present invention is not limited thereby. According to other embodiments, the active devices can be selectively top-gate TFTs or other active devices.

In light of the foregoing, a difference between the first voltage of the first pixel electrode and the second voltage of the second pixel electrode is served as the driving electric field for driving the display medium. Accordingly, by using the same driving chip, the pixel structure according to the invention is capable of providing larger driving electric field and has larger storage capacitance when comparing to the conventional pixel structure. Especially, the pixel structure according to the invention can be used for driving the display medium having large dielectric constant without modifying the current-adopted driving chip, which is conducive to reduce the cost for buying or developing a new driving chip. Furthermore, the common electrode is disposed under the first pixel electrode and the second pixel electrode in the manner of covering the areas of the first pixel electrode and the second pixel electrode, so that sufficient storage capacitance can be achieved. Transparent conductive material is adopted to fabricate the common electrode according to the invention, and thus the display aperture of the pixel structure is not negatively influenced by the configuration of the common electrode. In other words, in addition to providing sufficient driving electric field, the pixel structure according to the invention can have large storage capacitance and favorable display aperture.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A pixel structure disposed on a substrate, the pixel structure comprising:
   a scan line;
   a first data line intersected with the scan line;
   a second data line intersected with the scan line;
   a first active device electrically connected to the first data line;
   a second active device electrically connected to the second data line;
   a first pixel electrode electrically connected to the first active device;
   a second pixel electrode electrically connected to the second active device, the first pixel electrode and the second pixel electrode being located between the first data line and the second data line; and
   a common electrode formed by a rectangular electrode pattern not only disposed between the first pixel electrode and the substrate but also disposed between the second pixel electrode and the substrate, wherein the common electrode is not intersected with the first data line or the second data line, the first active device and the second active device are not overlapped with the common electrode, and a first voltage of the first pixel electrode and a second voltage of the second pixel electrode are not identical to a third voltage of the common electrode.

2. The pixel structure as claimed in claim 1, wherein a difference between the first voltage and the second voltage forms a driving electric field driving a display medium and the difference between the first voltage and the second voltage is greater than 10 volt.

3. The pixel structure as claimed in claim 2, wherein a material of the display medium comprises a blue phase liquid crystal material.

4. The pixel structure as claimed in claim 1, wherein the third voltage is identical to an average of the first voltage and the second voltage.

5. The pixel structure as claimed in claim 1, wherein the third voltage is located between the first voltage and the second voltage.

6. The pixel structure as claimed in claim 1, further comprising a common line electrically connected to the common electrode and substantially parallel to the scan line, wherein the common line substantially divides the pixel structure into two alignment areas.

7. The pixel structure as claimed in claim 6, wherein the first pixel electrode comprises a plurality of first stripe portions and the second pixel electrode comprises a plurality of second stripe portions, wherein an extending direction of a part of the first stripe portions located in one alignment area is different from an extending direction of the other part of the first stripe portions located in the other alignment area, an extending direction of a part of the second stripe portions located in the one alignment area is different from an extending direction of the other part of the second stripe portions located in the other alignment area, and the first stripe portions and the second stripe portions are alternatively arranged.

8. The pixel structure as claimed in claim 7, wherein the first pixel electrode further comprises:
   a first longitudinal connecting portion located between the first stripe portions and the first data line and substantially parallel to the first data line; and
   at least one first transversal connecting portion connected to the first longitudinal connecting portion, substantially parallel to the scan line, a portion of the first stripe portions being connected to the first longitudinal connecting portion, and the other portion of the first stripe portions being connected to the at least one first transversal connecting portion, wherein the common line has a first branch overlapped with the first longitudinal connecting portion.

9. The pixel structure as claimed in claim 7, wherein the second pixel electrode further comprises:
   a second longitudinal connecting portion located between the second stripe portions and the second data line and substantially parallel to the second data line; and
   a second transversal connecting portion connected to the second longitudinal connecting portions, substantially parallel to the scan line, overlapped with the common line, a portion of the second stripe portions being connected to the second longitudinal connecting portion, and the other portion of the second stripe portions being connected to the second transversal connecting portion, wherein the common line has a second branch overlapped with the second longitudinal connecting portion.

10. The pixel structure as claimed in claim 1, wherein a material of the common electrode comprises a transparent conductive material.

11. The pixel structure as claimed in claim 6, further comprising at least one insulation layer having a contact hole disposed between the common line and the common electrode, wherein the common line is electrically connected to the common electrode through the contact hole.

* * * * *